UNITED STATES PATENT OFFICE.

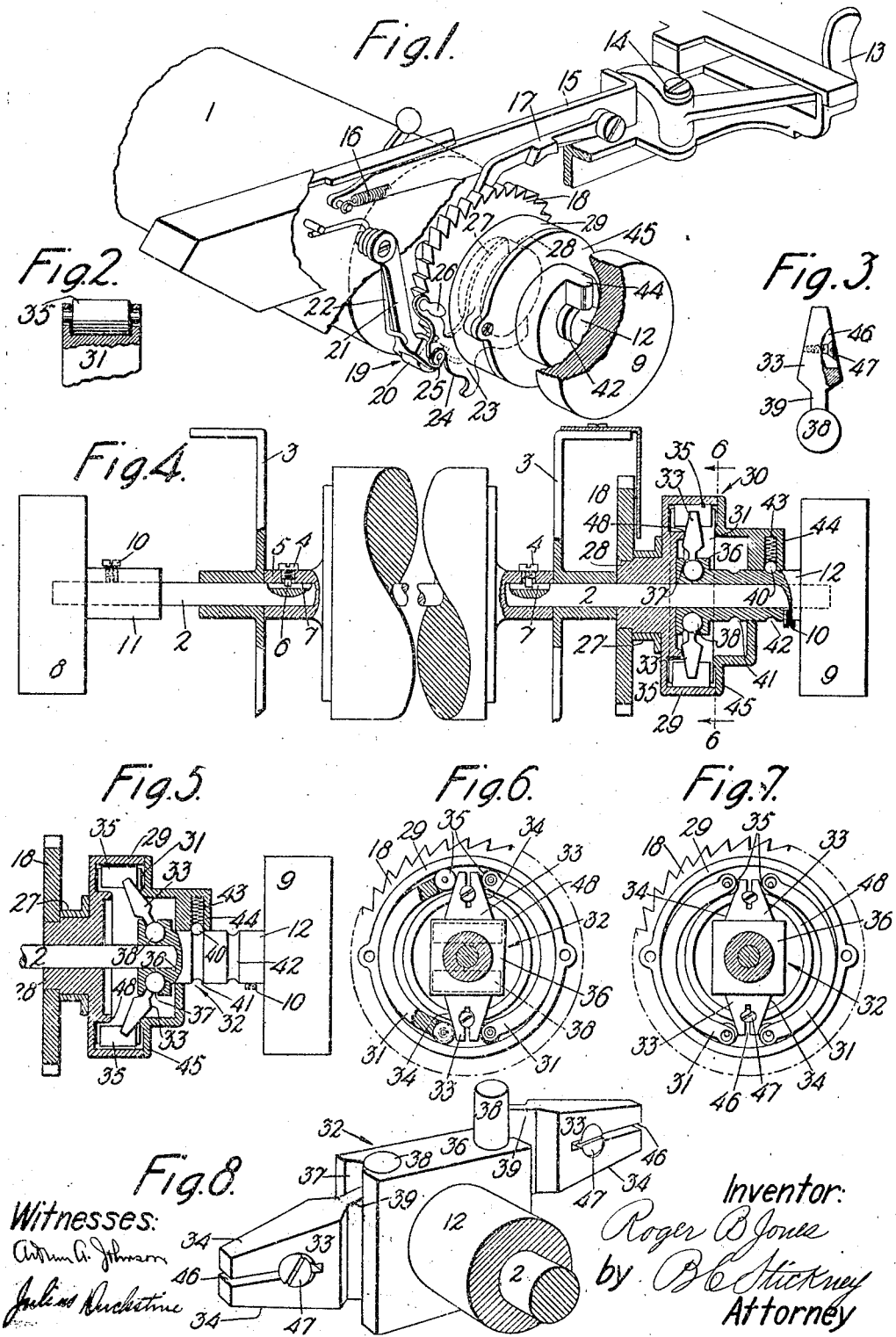

ROGER B. JONES, OF PHILADELPHIA, PENNSYLVANIA, ASSIGNOR TO UNDERWOOD TYPEWRITER COMPANY, OF NEW YORK, N. Y., A CORPORATION OF DELAWARE.

TYPE-WRITING MACHINE.

1,272,455. Specification of Letters Patent. Patented July 16, 1918.

Application filed March 3, 1917. Serial No. 152,165.

*To all whom it may concern:*

Be it known that I, ROGER B. JONES, a citizen of the United States, residing in Philadelphia, in the county of Philadelphia and State of Pennsylvania, have invented certain new and useful Improvements in Type-Writing Machines, of which the following is a specification.

This invention relates to an improvement in releasable connections between the line-space wheel and the platen in a type-writing machine, whereby the platen can be rotated any desired amount greater or less than a line-space movement without disturbing the line-space wheel.

It is likely to happen in devices of this character that the releasable connection slips, especially where the line-space mechanism is rather forcibly operated, and when the platen is of considerable length and mass. The releasable connection in the present invention is constructed so as to grip positively when in action, insuring that the line-space wheel and the platen shall move as a unit.

To do this, the releasable connection includes a drum having a circular internal friction surface in engagement with which are normally forced a pair of friction shoes in the form of bow-spring segments. These segments are really semi-circular rings having a curvature of a circle of somewhat less magnitude than that of the internal friction surface of the drum, so that the tendency of these segments is to spring away from engagement with the friction surface of the drum. The ends of the segments face each other in spaced relation, and are provided with rollers, between which work a pair of wedge-shaped camming arms. The camming arms are pivoted to a knuckle, and form a toggle. By the horizontal movement of the knuckle, the toggle arms are spread apart to give the outer ends thereof a centrifugal movement. This causes the toggle arms, by reason of the cams on their sides, to wedge in between the rollers, spreading the segments apart. The action is such that the segments or shoes are jammed into intimate engagement with the internal friction surface of the drum, and at the same time their arc of curvature may be flattened out, so as to approximate the curvature of the inner surface of the drum, thereby increasing the extent of friction surface between the drum and the shoes.

The combined toggle and camming action gives a very powerful and positive thrust, so as to prevent any possible slipping between the friction drum and the friction shoes. The segments or friction shoes are connected to the platen axle by the toggle arms, and the toggle knuckle and the axle have a rigid rotary connection with the platen. Thus, when the segments or shoes are tightly bound to the friction drum, they and the platen move as a unit with the line-space wheel.

The toggle action may be self-locking, as the arms may engage a limiting stop ring above their point of pivotal connection with the toggle knuckle, which enables the toggle to be very slightly overthrown beyond a dead center. The stop being in the form of a ring is universal to all rotary positions of the toggle relative to the drum. Additional detent means may be provided, to prevent accidental movement of the toggle and the shifting means therefor when in either released or closed position.

Although this connection between the line-space wheel and the platen is so positive that they are practically rigid with each other, nevertheless, the connection is easily releasable by simple means, for example by simply moving the axle lengthwise, so as to throw the toggle to the other side of its dead center. In this position, the toggle collapses and withdraws the wedge-arms to a certain extent from between the friction shoes or segments permitting them to contract and move out of gripping engagement with the internal surface of the friction drum.

An accurate adjustment of the extent of expanding action of the toggle arm cams on the friction shoes, may be secured. This may consist in splitting each toggle arm by means of a slot, and providing a conical boring therein into which conical screws may be adjusted to a greater or less depth according to the extent of spreading of the cams desired. Inasmuch as there is nothing except the screw itself that tends to spread the two halves of each toggle arm, it follows that adjustment is self-locking, as the natural resiliency of the metal will tend to grip the screw, and the halves are forced together by reason of their engagement with the ends of the shoes.

Other features and advantages will hereinafter appear.

In the accompanying drawings,

Figure 1 is a fragmentary perspective view showing the line-space mechanism.

Fig. 2 is an enlarged detail view of one of the ends of a friction shoe showing the mounting of the anti-friction roller on the same.

Fig. 3 is a detail edge view of one of the toggle arms broken away to show the means for taking up the wear and spreading the cams on the arms.

Fig. 4 is a contracted view in rear elevation partly in section to show the internal structure of the releasable connection between the platen axle and the line-space wheel. This view shows the friction elements in intimate engagement with each other, so that the line-space wheel is rigidly connected to the platen so as to move as a unit.

Fig. 5 is a sectional view of the connecting mechanism shown in Fig. 4. In this view, however, the connection is released with the toggle in its releasing position, so that the platen is free to rotate relative to the line-space wheel.

Fig. 6 is a vertical section on the line 6—6 of Fig. 4, showing the parts of the connecting mechanism in the relation in which they are found in Fig. 4, with the line-space wheel connected to move with the platen.

Fig. 7 is a view similar to Fig. 6, except that the parts are in the position shown in Fig. 5.

Fig. 8 is an enlarged detail perspective view showing the manner of mounting the toggle arms on the knuckle, whereby they can be readily detached and assembled.

The platen 1 is mounted on an axle 2 between side-plates 3, of the platen frame. These side-plates secure the platen from endwise movement relative to the platen frame and the typewriter carriage, but permit the platen to rotate. The platen 1 is secured to the axle 2 so as to rotate therewith by means of a pair of screws 4, mounted in hubs 5 of the platen and having reduced portions 6 entering slots 7 in the axle 2. This forms a key-and-slot connection whereby the axle 2 may move endwise relative to the platen 1, and yet rotate the platen 1 in its different longitudinal positions. In rotating the platen major amounts, there are provided on the ends thereof knobs 8 and 9. The knobs 8 and 9 are secured to the axle 2, so as to move therewith both longitudinally and rotatably by means of set screws 10, which pass through sleeves 11 and 12, provided on the knobs 8 and 9 and engage the axle 2.

For giving the platen 1 regular movements for line-spacing purposes, there is provided a line-space lever 13, Fig. 1, which is pivoted at 14 and when rocked thrusts rearwardly a slide 15 against the tension of a spring 16. The slide 15 is provided with a pawl 17 arranged in the well-known manner to engage a line-space wheel 18, so as to rotate the same, one, two or three teeth according to the extent of the line-space movement desired.

The line-space wheel 18 is yieldingly locked in any position to which it is moved by the line-space lever 13 by a detent 19. The detent includes a roller 20 engaging between the teeth of the line-space wheel 18 and mounted on a lever 21 held in active position by a spring 22. The detent 19 can be thrown out of action by means of a release 23 having a cam 24 to engage a follower 25 on the detent 19. The release 23 is provided with a handle 26, whereby it is operated and is provided also with a sleeve 27, by means of which it is pivotally mounted on a hub 28 of the line-space wheel 18.

The line-space wheel 18 is not rigidly secured at all times to the platen axle 2, but may be indirectly secured thereto, so as to transmit its regular line-space movements to the platen 1. As stated above, the line-space wheel 18 is secured rigidly to the hub 28, which, in turn, is provided with an enlargement forming a drum 29. The internal peripheral surface of the drum 29 forms one element of a releasable connection 30, Fig. 4, which joins the platen axle and the platen to the line-space wheel 18. The other element of this connection includes a pair of bow-shaped friction members or shoes 31, which have a tendency to contract to the position shown in Fig. 7, where they have the least amount of their surface in engagement with the friction surface of the drum 29. That is to say the shoes have the curvature of a circle of less magnitude than that of the internal friction surface of the drum 29 but may be distorted to a curvature of the same magnitude to increase their friction contacting surface with the drum.

To expand these friction shoes into tight engagement with the friction drum 29, there is provided an expander 32, Fig. 8, including a pair of arms 33, engaging between the opposite ends of the two semi-circular friction members. These arms are provided each with a pair of cam surfaces 34, so that they act as camming wedges, and force the ends of the friction members out in a centrifugal direction and thus enable the major portion of the surfaces of the friction shoes to engage with the friction surfaces of the drum 29. In order to take up a part of the friction of this movement, there are provided rollers 35 on the ends of the friction bow-members, which are loosely mounted as indicated in Figs. 2 and 7, whereby they may be forced into intimate engagement in a surface of the drum 29, so as to add to the gripping action.

The arms 33 besides being camming arms are toggle arms, and are pivotally mounted in a knuckle 36 of the expander 32. In order to enable the parts of the toggle to be readily assembled and give a construction of considerable strength, the knuckle 36 is provided with cylindrical borings open at the one side by means of V-shaped grooves 37. The toggle arms are provided with cylindrical hinges or shoulders 38, which may be inserted endwise in the cylindrical borings and the arms are reduced at 39 to pass through the open sides of the cylindrical borings. This enables a limited pivotal movement between the arms and the knuckle 36.

The knuckle 36 is secured or formed on the sleeve 12 of the knob 9 nearest to the line-space mechanism. As both of the knobs 8 and 9 are secured to the axle for bodily movement therewith, it is merely necessary to shift the axle by either knob endwise and thus the expander will be released and the toggle collapsed from the Figs. 4 and 6 position to the Figs. 5 and 7 position. In either position of adjustment the parts are locked against accidental movement by means of a spring-pressed detent 40, which engages in either of a pair of sockets 41 and 42, according to whether the connection is closed or released. The detent 40 and its spring are located in sockets 43 provided in an offset 44 of a cover-plate 45, which closes the open side of the drum 29, concealing and protecting the parts of the connection and the expander.

For the purpose of giving an accurate adjustment so as to definitely determine the expanding action of the cam toggle on the friction shoes 31, there is provided in each of the arms 33 a slot 46 threaded into each of which there is provided a conical screw 47. By turning up these screws more or less, the spread relation of the cams 34 on each arm may be determined so as to determine the extent which the arms will wedge apart and expand the friction shoes 31. This enables the drum 29 and the shoes 31 to have the greatest amount of grip at the same time permit the toggle to be thrown its full stroke to a locking position very slightly beyond a dead center. In this position it rests on a ring stop 48 which is universal to all relative rotary positions of the toggle with respect to the drum 29.

It will thus be seen that normally the line-space wheel 18 is rigidly joined to the axle 2 and to the platen 1, so that regular line-space movements of the wheel 18 will be accurately transmitted to the platen. If it is desired to move the platen less than a line-space or an irregular amount to get a readjustment on the work-sheet without disturbing the position of the line-space wheel, the axle 2 is moved endwise by either one of its knobs, thus moving the expander from the Figs. 4 and 6 position to the Figs. 5 and 7 position, withdrawing the camming toggle arms from their expanding position, permitting the friction members 31 to contract, loosening their clutch on the drum 29. The platen may then be rotated by means of the knobs 8 and 9 relative to the line-space wheel 18 any desired amount. When the exact position of the platen is obtained, it is reconnected to the line-space wheel 18 by moving the platen axle 2 to the left, Fig. 4, causing the toggle arms to cam outwardly the ends of the friction members 31 expanding these members into intimate contact with the friction drum 29. The knuckle 36 of the toggle arms expander passes very slightly beyond a dead center into engagement with the ring stop 48, so as to lock the parts in their connecting relation.

Variations may be resorted to within the scope of the invention, and portions of the improvements may be used without others.

Having thus described my invention, I claim:

1. In a typewriting machine, the combination with a platen and a line-space wheel therefor, of interengaging elements for connecting said platen and said line-space wheel, and arms having cam surfaces acting on said elements, and also having a toggle movement to force and hold said elements in gripping relation with each other.

2. In a typewriting machine, the combination with a platen and a line-space wheel therefor, of means including gripping members connecting said line-space wheel and said platen to move as a unit, and pivoted arms forming a toggle, said arms being wedge-shaped and inserted between certain of said gripping members to wedge them into gripping action.

3. The combination with a platen, of a line-space wheel for said platen, a gripping mechanism for connecting said platen and said line-space wheel to move as a unit, said mechanism comprising a friction drum, a pair of separate friction shoes, and a pair of wedging cam arms acting with a toggle movement to engage between said friction shoes at two points spreading and expanding them into engagement with said friction drum.

4. The combination with a platen, of a line-space wheel for said platen, a releasable connection for joining said line-space wheel and said platen to move as a unit, toggle links for bringing about a gripping relation of the elements of said connection, and a ring stop forming part of the hub of said line-space wheel and engaging said toggle links between the ends thereof and their pivots in all relative positions of said connecting elements, so as to limit the movement of said toggle to a locking position very slightly beyond the dead center.

5. The combination with a platen, of a platen axle, a key-and-slot connection between said platen and said platen axle, a line-space wheel loosely mounted on said axle and supported solely by said axle, a friction drum secured to said line-space wheel, a toggle secured to rotate with said platen axle, and a pair of friction shoes loosely mounted in said drum on opposite sides of said toggle, said toggle having cam surfaces arranged to engage said friction shoes, when said axle is moved longitudinally by means of said key-and-slot connection, so as to force said shoes into frictional contact with said drum.

6. The combination with a platen, of a platen axle, a sleeve on said axle, a knuckle secured to said sleeve, a line-space wheel loosely mounted concentric with said platen, a friction drum secured to said line-space wheel, friction members to engage said drum, and a pair of toggle arms engaging said friction members to force them into clutch relations with said drum, having an inlocked shoulder and socket engaging with said knuckle.

7. The combination with a platen, of a line-space wheel for said platen, a releasable connection between said line-space wheel and said platen enabling them to normally move as a unit, including gripping elements, and a pair of double cam arms for forcing the said elements in gripping engagement, each of said cam arms having a slot therein and conical screws for engaging said slots to spread the cam surfaces greater or less distances from each other, so as to determine accurately the gripping action.

8. The combination with a platen axle, of a platen secured to said axle, a line-space wheel for said platen, a friction drum secured to said line-space wheel, a pair of camming toggle arms secured to said platen axle, and a pair of bow friction members within said drum on opposite sides of said camming arms, said members having rollers engaging the cams of said arms and loosely pivoted in said members to have a certain amount of lost motion.

9. The combination with a platen, of a line-space wheel for said platen, a releasable connection for enabling said line-space wheel and said platen to normally move as a unit, said releasable connection including frictionally engaging members, and a double cam arm for forcing said members into locking engagement having a self-locking adjustment for spreading the cam surfaces of said arm greater or less distances apart, so as to vary the extent of camming action thereof.

ROGER B. JONES.

Witnesses:
W. H. LAUBENSTEIN,
ELIZABETH HURLEY.